(12) United States Patent
Cui et al.

(10) Patent No.: US 11,410,333 B2
(45) Date of Patent: Aug. 9, 2022

(54) METHOD, DEVICE, AND STORAGE MEDIUM FOR PROVIDING VISUAL REPRESENTATION OF SET OF OBJECTS

(71) Applicant: BEIJING BAIDU NETCOM SCIENCE AND TECHNOLOGY CO., LTD., Beijing (CN)

(72) Inventors: Xuefei Cui, Beijing (CN); Ye Zhang, Beijing (CN); Chengyuan Zhao, Beijing (CN); Ying Zhu, Beijing (CN); Yilin Zhang, Beijing (CN); Yingjie Shao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 16/750,403

(22) Filed: Jan. 23, 2020

(65) Prior Publication Data
US 2020/0242803 A1    Jul. 30, 2020

(30) Foreign Application Priority Data

Jan. 29, 2019 (CN) .......................... 201910087406.0

(51) Int. Cl.
*G06T 7/77* (2017.01)
*G06T 7/73* (2017.01)

(52) U.S. Cl.
CPC . *G06T 7/77* (2017.01); *G06T 7/74* (2017.01)

(58) Field of Classification Search
CPC ............ G06F 16/904; G06T 7/77; G06T 7/74
See application file for complete search history.

(56) References Cited

U.S. PATENT DOCUMENTS

| 5,729,704 A * | 3/1998 | Stone ...................... G06T 11/00 |
| | | 345/619 |
| 9,934,424 B2 * | 4/2018 | Bostick ............... G06V 40/172 |
| 2007/0097148 A1 | 5/2007 | Tanaka |
| 2009/0128507 A1 * | 5/2009 | Hoshino ................. G06F 3/016 |
| | | 345/173 |

(Continued)

FOREIGN PATENT DOCUMENTS

| CN | 101443730 A | 5/2009 |
| CN | 102568025 A | 7/2012 |

(Continued)

OTHER PUBLICATIONS

Japanese Patent Application No. 2020-000667 Office Action dated Dec. 22, 2020, 3 pages.

(Continued)

*Primary Examiner* — John B Strege
(74) *Attorney, Agent, or Firm* — Lathrop GPM LLP (57) ABSTRACT

A method, a device and a computer-readable storage medium for providing a visual representation of a set of objects are provided. The method includes determining a first position in a drawing area, the first position for providing first display information of a first object in the set of objects; determining a usable position associated with the first position from a plurality of preset positions in the drawing area; determining a second object associated with the first object from the set of objects; and providing second display information of the second object in the usable position.

17 Claims, 6 Drawing Sheets

(56) References Cited

U.S. PATENT DOCUMENTS

| | | |
|---|---|---|
| 2009/0307623 A1 | 12/2009 | Agarawala et al. |
| 2010/0058213 A1* | 3/2010 | Higuchi ............... H04N 21/482 |
| | | 715/766 |
| 2010/0192093 A1* | 7/2010 | Isozu .................... G06Q 30/02 |
| | | 715/810 |
| 2013/0268373 A1* | 10/2013 | Grishaver ............. G06Q 30/02 |
| | | 705/14.67 |
| 2014/0181089 A1* | 6/2014 | Desmond ........... G06F 16/5866 |
| | | 707/722 |
| 2018/0365337 A1 | 12/2018 | Sexton et al. |
| 2020/0183980 A1* | 6/2020 | Barkow ................ G06F 16/904 |

FOREIGN PATENT DOCUMENTS

| | | |
|---|---|---|
| CN | 103647754 A | 3/2014 |
| CN | 107622792 A | 1/2018 |
| CN | 107992522 A | 5/2018 |
| CN | 108170397 A | 6/2018 |
| CN | 109086315 A | 12/2018 |
| CN | 109271525 A | 1/2019 |
| JP | 2008129942 A | 6/2008 |
| JP | 2010176204 A | 8/2010 |
| WO | WO 2012173697 A1 | 12/2012 |

OTHER PUBLICATIONS

Japanese Patent Application No. 2020-0006670 English translation of Office Action dated Dec. 22, 2020, 3 pages.
Chinese Patent Application No. 201910087406.0 First Office Action dated Jul. 3, 2020, 12 pages.
Chinese Patent Application No. 201910087406.0 English translation of First Office Action dated Jul. 3, 2020, 10 pages.
European Patent Application No. 20151357.9 extended Search and Opinion dated May 14, 2020, 7 pages.
Knowledge Graphs and Youtube, Berkay Ataman, cited in First Office Action of Chinese Patent Application No. 201910087406.0 http://medium.com/brkyataman/knowledge-graph-and-youtube-29d259fd3dc1 Oct. 2018, 4 pages.
Chinese Patent Application No. 201910087406.0 Office Action dated May 7, 2021, 11 pages.
Chinese Patent Application No. 201910087406.0 English translation of Office Action dated May 7, 2021, 10 pages.

* cited by examiner

METHOD, DEVICE, AND STORAGE MEDIUM FOR PROVIDING VISUAL REPRESENTATION OF SET OF OBJECTS

CROSS-REFERENCE TO RELATED APPLICATION

This application claims priority to and benefit of Chinese Patent Application No. 201910087406.0, filed with the China National Intellectual Property Administration on Jan. 29, 2019, the entire content of which is incorporated herein by reference.

FIELD

Embodiments of the present disclosure relate to the field of computers, and more particularly, to a method, a device, and a computer-readable storage medium for providing a visual representation of a set of objects.

BACKGROUND

With the advent of the information age, information of more and more objects may be organized in a form of knowledge maps. For example, the knowledge map's visualization may provide a user with knowledge in a more intuitive image form, thus improving efficiency of obtaining knowledge and information for the user. In addition, a visual representation of the knowledge map may display a correlation between one object and another object and attribute information related to the objects, which may enrich display information of a single object. The present disclosure provides methodology that enables visual representation of a set of objects such as the knowledge map more efficiently to provide information required by the user.

SUMMARY

In a first aspect of embodiments of the present disclosure, there is provided a method for providing a visual representation of a set of objects. In one embodiment, the method includes determining a first position in a drawing area, the first position for providing first display information of a first object in the set of objects; determining a usable position associated with the first position from a plurality of preset positions in the drawing area; determining a second object associated with the first object from the set of objects; and providing second display information of the second object in the usable position.

In a second aspect of embodiments of the present disclosure, there is provided a device. In one embodiment, the device includes one or more processors and a storage device. The storage device is configured to store one or more programs. When the one or more programs are executed by the one or more processors, the one or more processors are caused to implement the method according to the first aspect of the present disclosure.

In a third aspect of embodiments of the present disclosure, there is provided a computer-readable storage medium having computer programs stored thereon. In one embodiment, when the computer programs are executed by a processor, the method according to the first aspect of the present disclosure is implemented.

It should be understood that, descriptions in Summary of the present disclosure are not intended to limit an essential or important feature in embodiments of the present disclosure, and are also not construed to limit the scope of the present disclosure. Other features of the present disclosure will be easily understood by following descriptions.

BRIEF DESCRIPTION OF THE DRAWINGS

The above and other features, advantages and aspects of respective embodiments of the present disclosure will become more apparent with reference to accompanying drawings and following detailed illustrations. In the accompanying drawings, the same or similar numeral references represent the same or similar elements, in which.

DETAILED DESCRIPTION

Description will be made in detail below to embodiments of the present disclosure with reference to accompanying drawings. It should be understood that, although some embodiments of the present disclosure are illustrated in the accompanying drawings, embodiments of the present disclosure may be implemented by various ways, but not be construed as a limitation of the embodiments illustrated herein. On the contrary, those embodiments provided are merely for a more thorough and complete understanding of the present disclosure. It should be understood that, the accompanying drawings and those embodiments of the present disclosure are merely for exemplary purposes, but is not meant to limit the protection scope of the present disclosure.

In the description of embodiments of the present disclosure, the terms "include" and its equivalents like should be understood as an open "include", that is, "include but not limited to". The terms "based on" should be understood as "based on at least or in part (at least partially based on or at least part based on)". The terms "an embodiment" or "the embodiment" should be understood as "at least one embodiment". The terms "first", "second" and the like may represent different or same objects. Other explicit and implicit definitions may also be included below.

As discussed above, a visual representation of a set of objects may help a user more intuitively understand and obtain relationships among respective objects in the set of objects, and enable the user to more conveniently obtain information associated with respective objects. There has been a solution for providing the visual representation of the set of objects such as the knowledge map through a force-directed graph. However, the visual representation based on the force-directed graph may not control distribution of respective nodes in the visual representation, causing that the visual representation is more scattered. The visual representation based on the force-directed graph may not provide efficient relationship information in a device with a smaller screen such as a mobile device, thus enabling that it is difficult for the user to obtain required information through the visual representation.

According to embodiments of the present disclosure, a solution for providing a visual representation of a set of objects is provided. In the solution, a first position in a drawing area is determined firstly. The first position is configured to providing first display information of a first object in the set of objects. Then, a usable position associated with the first position may be determined from a plurality of preset positions in the drawing area, and a second object associated with the first object may be determined from the set of objects. Next, second display information of the second object may be provided in the determined usable position. The present disclosure may display the relationships among respective objects in the set of objects more clearly, and improve the efficiency of obtaining the information for the user.

Figure 1:
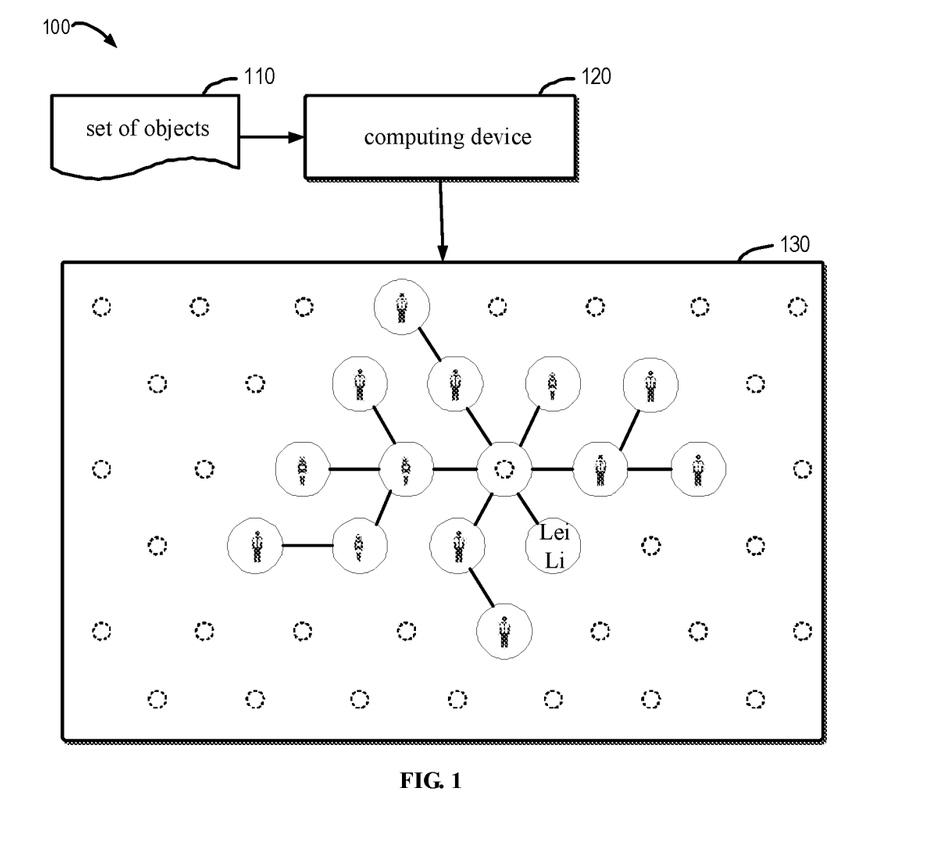
FIG. 1 is a block diagram illustrating an exemplary scene where a plurality of embodiments of the present disclosure may be implemented.

Detailed description will be made below to embodiments of the present disclosure with reference to accompanying drawings. FIG. 1 is a block diagram illustrating an exemplary scene 100 where a plurality of embodiments of the present disclosure may be implemented. In the exemplary scene 100, a computing device 120 may receive a set 110 of objects. In some embodiments, the set 110 of objects may include object information and object relationship information. The object information may include metadata related to each object in the set 110 of objects. The metadata may include such as a name, a role and an identifier of the object, and a resource address associated with the object. The object relationship information may include information indicating the relationships among respective objects in the set 110 of objects.

In some embodiments, the set 110 of objects may be sent to the computing device 120 by means of wired communication or wireless communication. In some embodiments, the computing device 120 may also receive the set 110 of objects through an input device coupled to the computing device 120.

As illustrated in FIG. 1, the computing device 120 may provide a visual representation 130 corresponding to the set 110 of objects based on the received set 110 of objects. For example, in the example in FIG. 1, the computing device 120 may generate the visual information 130 indicating information of respective objects in the set 110 of objects and relationships among respective objects. It should be understood that, the illustrated visual representation is merely exemplary, and the scope of the present disclosure is not limited thereto.

Figure 2:
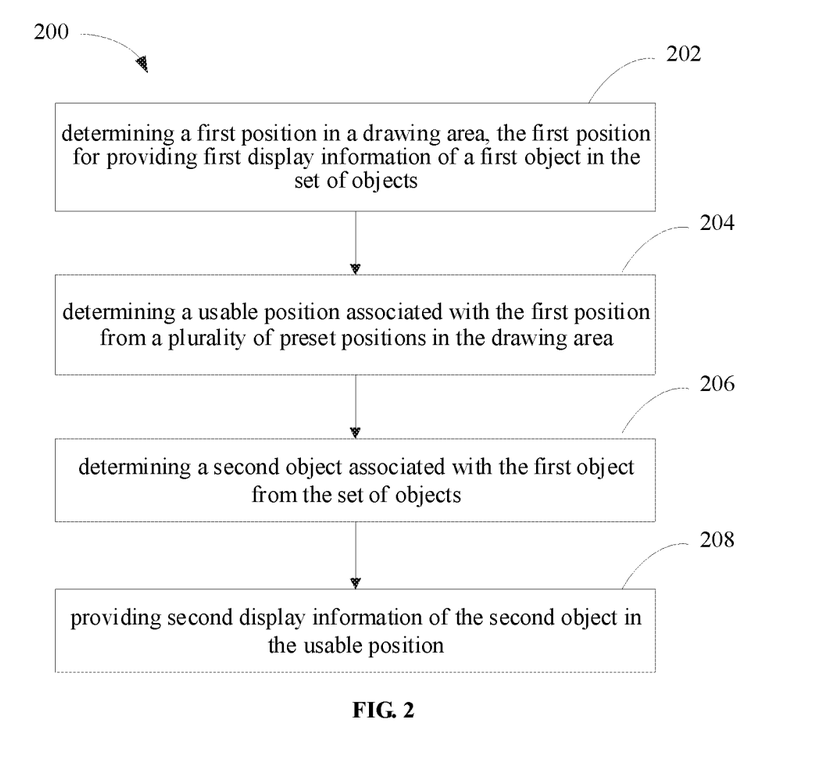
FIG. 2 is a flow chart illustrating a procedure for providing a visual representation of a set of objects according to embodiments of the present disclosure.

A procedure for answering a question will be described in more detail below with reference to FIGS. 2 to 6. FIG. 2 is a flow chart illustrating a procedure 200 for providing a visual representation of a set of objects according to some embodiments of the present disclosure. The procedure 200 may be implemented by the computing device 120 illustrated in FIG. 1. For discussing conveniently, the procedure 200 will be described below with reference to FIG. 1, FIG. 3-FIG. 6.

At block 202, the computing device 120 determines a first position in a drawing area. The first position is configured to providing first display information of a first object in the set 110 of objects. In some embodiments, the set 110 of objects may include object information of one or more objects in the set 110 of objects. For example, the object information may include metadata related to each object in the set 110 of objects. The metadata may include such as a name of the object, a role of the object, an identifier of the object, and a resource address associated with the object. For example, the object information associated with a single object may be organized as:

```
{
Src: "static/image/1.jpeg",
Id: "1",
Role: "1",
Name: "SanZhang"
}
{
Src: "static/image/2.jpeg",
Id: "2",
Role: "0",
Name: "SiLi"
}.
```

The field "Src" may store the address of the image of the object, the field "Id" may indicate the identifier of the object, the field "Role" may store the role of the object (such as, whether is a main character), and the field "Name" may store the name of the object.

In some embodiments, the computing device 120 may also receive the object relationship information indicating relationships among respective objects in the set 110 of objects. In some embodiments, the object relationship information may be stored in the set of objects. In some embodiments, the computing device 120 may also read the corresponding object relationship information from the storage device. For example, the object relationship information may be organized as:

```
{
Source: "1",
Target: "2",
Relation: "friend"
}
```

"Source" represents an identifier of a source object, "Target" represents an identifier of a target object, and "Relation" represents a relationship between the source object and the target object. For example, the object relationship information represents that an object of which the identifier is "1" and an object of which the identifier is "2" are friends. It should be understood that, the object information and the object relationship information described above are merely exemplary, any suitable way may be employed to organize the object information and the object relationship information, and the scope of the present disclosure is not limited thereto.

Figure 3:
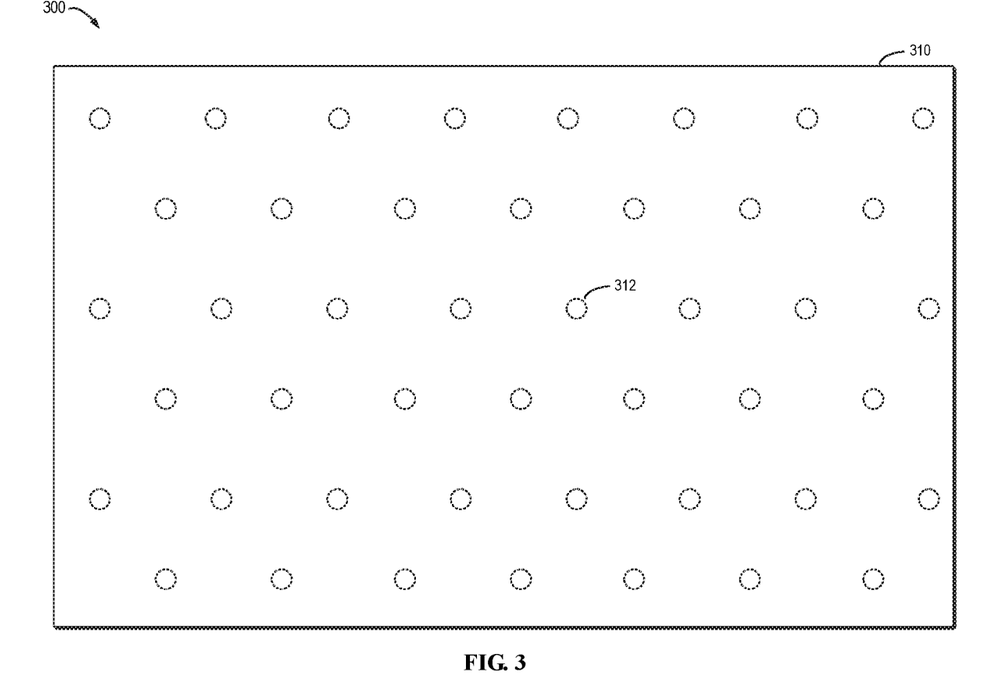
FIG. 3 is a schematic diagram illustrating setting a preset drawing area according to embodiments of the present disclosure.

In some embodiments, in order to provide the visual representation corresponding to the set 110 of objects, the computing device 120 may set a preset drawing area. In some embodiments, the drawing area may be a canvas with a predetermined size for presenting the visual representation of the set 110 of objects. FIG. 3 is a schematic diagram 300 illustrating setting a preset drawing area according to embodiments of the present disclosure. As illustrated in FIG. 3, the computing device 120 may set the preset drawing area 310 in advance.

In some embodiments, as illustrated in FIG. 3, the computing device 120 may also determine a plurality of preset positions in the drawing area 310, and these preset positions may be used to provide visual representations of possible objects. In some embodiments, the plurality of preset positions are distributed in the drawing area 310 uniformly or regularly in rows or columns. In some embodiments, the computing device 120 may receive the user input to configure how these preset positions should be distributed. By fixing a position where the visual representation of each object may be provided, the computing device 120 may ensure that the visual representation 130 of the set 110 of objects is regularly ordered, thus improving the efficiency of obtaining information through the visual representation 130 for the user. In addition, such organization way may also be more suitable for display of a device with a small screen.

For example, as illustrated in FIG. 3, the plurality of preset positions are distributed uniformly, for example, there may be 6 positions adjacent to a position 312. Such positions are arranged in a regular hexagon around position 312. In some embodiments, the plurality of preset positions are distributed uniformly and there may be 4 positions adjacent to the position 312, and such positions are arranged in a regular quadrilateral around position 312. It should be understood that, these detailed distributions are merely exemplary, any suitable distribution of the preset positions may be employed, and the scope of the present disclosure is not limited thereto.

In some embodiments, when display information of any object does not be provided in the drawing area 310, the computing device 120 may obtain a main object in the set 110 of objects as the first object. In some embodiments, the main object may represent a preset core object in the set 110 of objects to be presented for the user. In some embodiments, the main object may also an object which the user is currently interested in and is determined in response to the user input. For example, the computing device 120 may receive a query (such as SanZhang) of the user input, and determine the main object as "SanZhang". For example, the computing device 120 may determine an object of which a value of the field "Role" is "1" (i.e., the role is the main character) in the set 110 of objects as the first object.

For the main object (such as, an object of which the role is the main character) in the set 110 of objects, the computing device 120 may automatically select a position which is in the center of the plurality of preset positions as display information provided for the main object. For example, in the example of FIG. 3, the computing device 120 may determine the position 312 as the first position for providing the first display information of the first object in the set 110 of objects.

In some embodiments, the computing device 120 may obtain the first display information of the first object based on the object information. For example, the computing device 120 may obtain information such as the name of the object, the role of the object and the identifier of the object, and provide such information in the first position 312. In some embodiments, the computing device 120 may also obtain the resource address such as "static/image/1.jpeg" associated with the first object based on the object information. The computing device 120 may access the resource address to obtain an image associated with the first object, and display the image in the first position 312.

Figure 4:
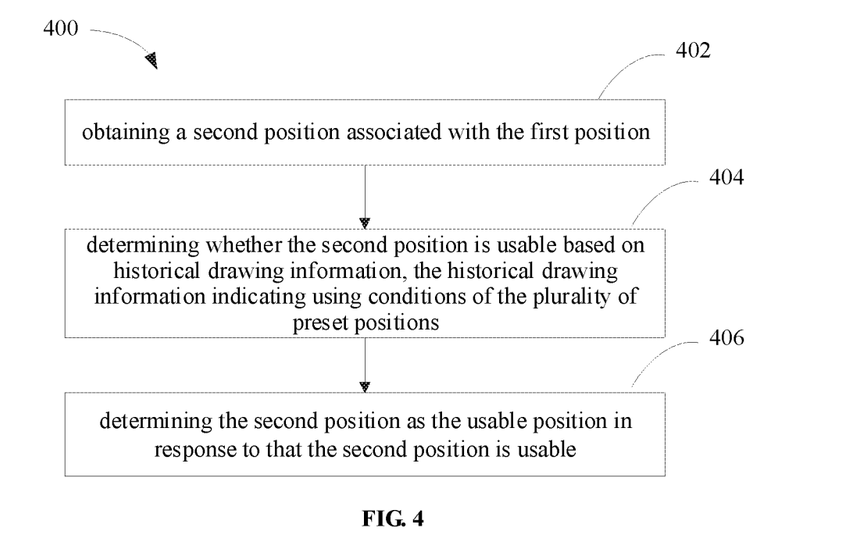
FIG. 4 is a flow chart illustrating a procedure for determining a usable position according to embodiments of the present disclosure.

Continuing with FIG. 2, at block 204, the computing device 120 determines a usable position associated with the first position from a plurality of preset positions in the drawing area 310. Continuing with the examples in FIG. 3, after the display for the object in the first position 312 is completed, the computing device 120 may determine the usable position associated with the first position 312. A detailed procedure of actions at block 204 will be described below with reference to FIG. 4. FIG. 4 is a flow chart illustrating a procedure 400 for determining a usable position according to embodiments of the present disclosure.

Figure 5:
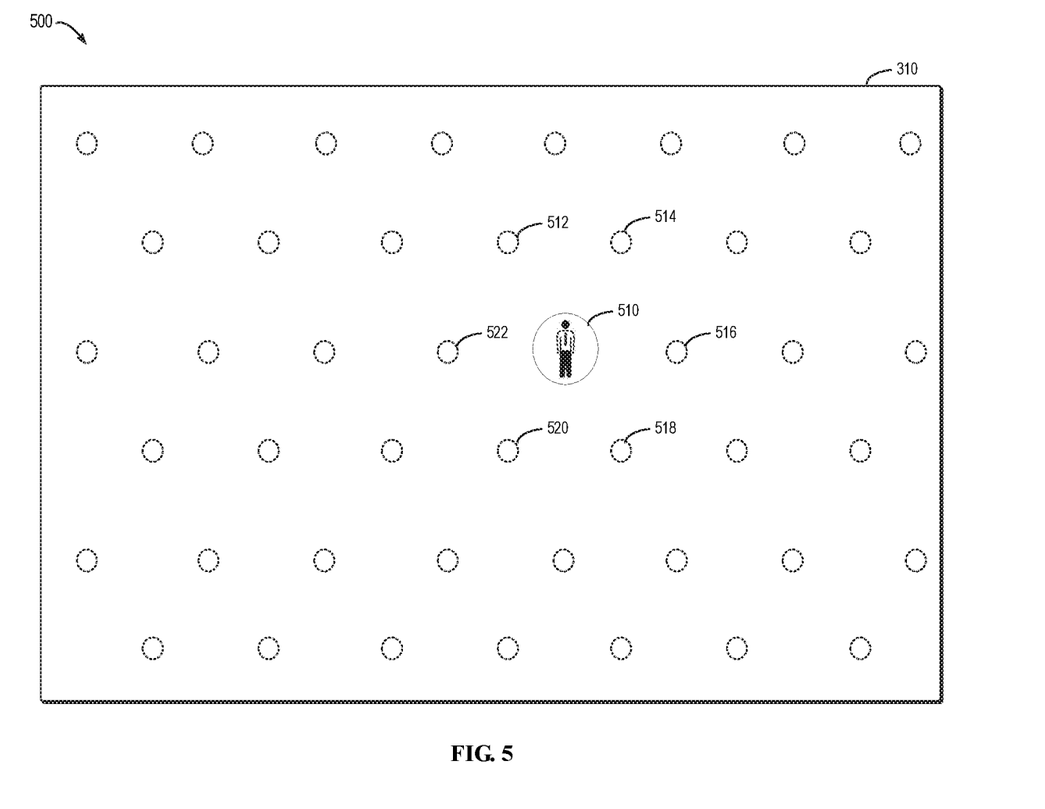
FIG. 5 is a schematic diagram illustrating determining a usable position according to embodiments of the present disclosure.

At block 402, the computing device 120 obtains a second position associated with the first position. As illustrated in FIG. 5, the computing device 120 may obtain the second position adjacent to the first position 510 after completing proving the first display information in the first position 510. In some embodiments, the computing device 120 may distribute a corresponding identifier to each preset position, and store adjacent information of each identifier. As illustrated in FIG. 5, the computing device 120 may obtain a second position 512 adjacent to the first position 510 based on the adjacent information.

At block 404, the computing device 120 determines whether the second position is usable based on historical drawing information. The historical drawing information indicates using conditions of the plurality of preset positions. In some embodiments, the computing device 120 may maintain the historical drawing information for indicating the using conditions of the plurality of preset positions. For example, the computing device 120 may mark the first position 510 in the historical drawing information as "used" after providing the first display information in the first position 510.

At block 406, the computing device 120 determines the second position as the usable position in response to that the second position is usable. FIG. 5 is a schematic diagram 500 illustrating determining a usable position according to embodiments of the present disclosure. In the example of FIG. 5, the computing device 120 may determine the second position 512 as the usable position based on the historical drawing information.

Continuing with FIG. 2, at block 206, the computing device 120 determines a second object associated with the first object from the set of objects. In some embodiments, the computing device 120 may obtain object relationship information for indicating whether there is a relationship between the first object and an object other than the first object in the set of objects. As described above, in some embodiments, the set 110 of objects may include the object relationship information for indicating relationships among respective objects in the set 110 of objects. In some embodiments, the computing device 120 may extract relationship information for indicating whether there is a relationship between the first object and an object other than the first object in the set of objects based on the object relationship information.

After, the computing device 120 may select the second object associated with the first object from the set of objects based on the relationship information. In some embodiments, for example, the computing device 120 may determine the second object associated with the first object according to the field "Source" and the field "Target" in the object relationship information. For example, the computing device 120 may determine that an object of which an identifier is "2" is associated with the first object based on the object relationship information. In some embodiments, each object in the set 110 of objects may be set with weight information in advance. When there are a plurality of objects associated with the first object, the computing device 120 may sequentially select an object with a higher weight as the second object to be displayed based on the weight information. Based on such way, the computing device 120 may ensure to display an object with a higher weight preferentially.

Continuing with FIG. 2, at block 208, the computing device 120 provides second display information associated with the second object in the usable position. In some embodiments, the computing device 120 may obtain the second display information based on object information associated with the second object. In some embodiments, the second display information includes at least one of: an identifier, an image, a shape and a color for indicating the second object. For example, in some embodiments, the computing device 120 may obtain information of the second object such as a name, a role and an identifier as the second display information based on the object information. In some embodiments, the computing device 120 may obtain the second display information based on a resource address associated with the second object. For example, the computing device 120 may also obtain a resource address such as "static/image/1.jpeg" associated with the second object based on the object information. The computing device 120 may access the resource address to obtain an image associated with the second object and take the image as the second display information.

In some embodiments, the computing device 120 may display the obtained second display information in the usable position 512. For example, the computing device 120 may display the image of the second object in the usable position 512. In some embodiments, the second display information includes any of: a name (SiLi) for indicating the second object, an image for indicating the second object, a shape for indicating the second object and a color for indicating the second object. In some embodiments, different shapes and/or different colors may be associated with a specific role of the second object.

In some embodiments, the computing device 120 may connect the first display information with the second display information in the drawing area 310 to embody a relationship between the first object and the second object. In some embodiments, the computing device 120 may distinguish different relationship types by different lines. For example, a husband-wife relationship is embodied by a red line, and a friend relationship is embodied by a block line. In some embodiments, the computing device 129 may also display a text indicating the relationship between the first object and the second object in the line.

In some embodiments, in response to providing the second display information, the computing device 120 may update the historical drawing information to indicate that the usable position 512 is used, such that it may be known that the position 512 is used when a usable position is determined next time, thus avoiding that display information of different objects is provided repeatedly in a certain position.

Continuing with the example of FIG. 5, the computing device 120 may determine usable positions 512, 514, 516, 518, 520 and 522 sequentially, determine objects associated with the first object in the set of objects sequentially, and provide display information of the objects in the corresponding usable positions. The computing device 120 may executes the actions at block 202-208 iteratively until completing providing for display information of all objects.

Figure 6:
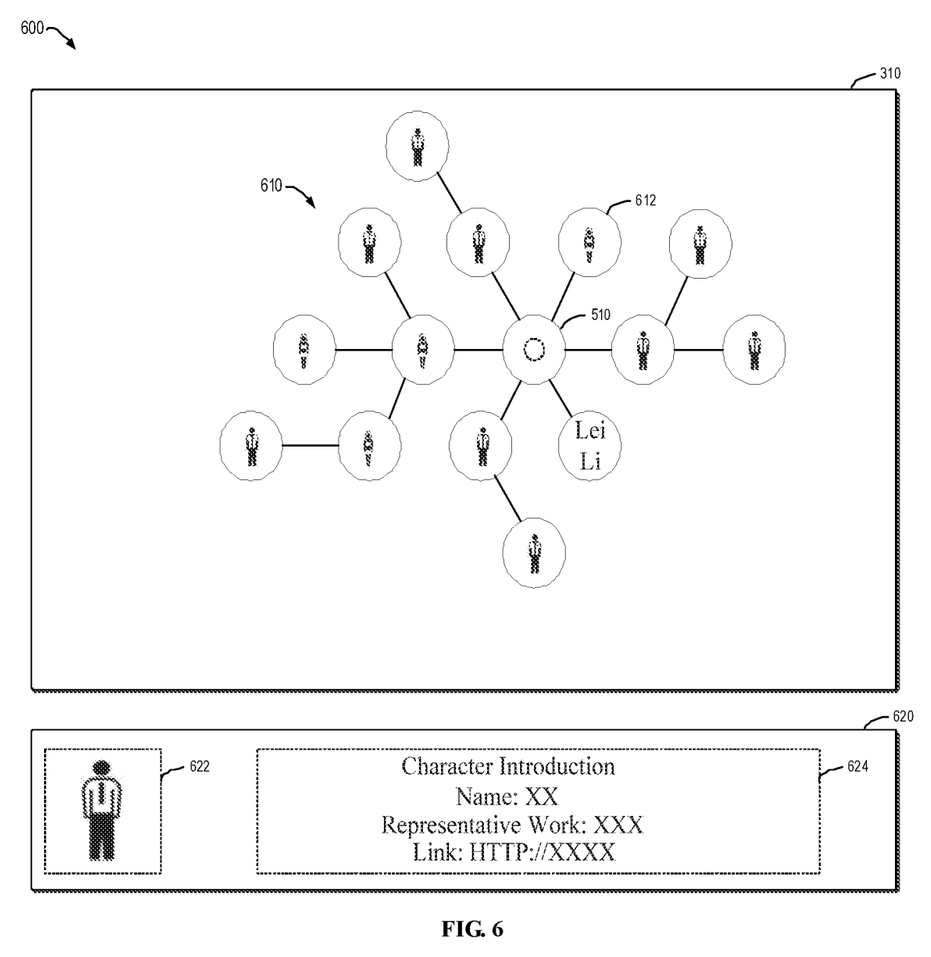
FIG. 6 is a schematic diagram illustrating an exemplary visual representation according to embodiments of the present disclosure.

FIG. 6 is a schematic diagram 600 illustrating an exemplary visual representation according to embodiments of the present disclosure. For example, a final visual representation of the set 110 of objects is illustrated as a visual representation 610. In some embodiments, the computing device 120 may display additional information associated with the first object in a display area 620 other than the drawing area 310. In some embodiments, the additional information may include an image and/or video information 622 associated with the first object. In some embodiments, the additional information may also include text information 624 associated with the first object, such as more detailed introduction for the first object. By providing such additional information, the computing device 120 may make it easier for the user to obtain detailed information about objects that the user cares about.

Based on the above method, by setting preset positions with an orderly rule for providing the display information, the computing device 120 may ensure that the provided visual representation is presented based on the orderly rule, thus overcoming a disadvantage that the existing visual representation based on the force-directed graph is disordered, enabling the display for the information of the set of objects more clearly and intuitively, and improving the efficiency of obtaining information for the user. In addition, such organization way is also more suitable for the display of a device with a smaller screen such as a mobile device.

In some embodiments, the computing device 120 may also receive any selection for any display information in the data identifier 610. In some embodiments, in response to receiving a selection for display information associated with a specific object (such as, the second object), the computing device 120 may generate a new visual representation taking the second object as the main object based on the selection. In some embodiments, the computing device 120 may provide additional information associated with the second object in response to determining that the second display information 612 is selected. In some embodiments, the computing device 120 may change an appearance of the second display information based on the selection. In some embodiments, the computing device 120 may emphasize the second display information in response to the selection, for example, enlarging the second display information, changing the color of the second display information, etc. Based on such way, the user may quickly switch to other object which the user interests in, and obtain more detailed information of the object.

Figure 7:
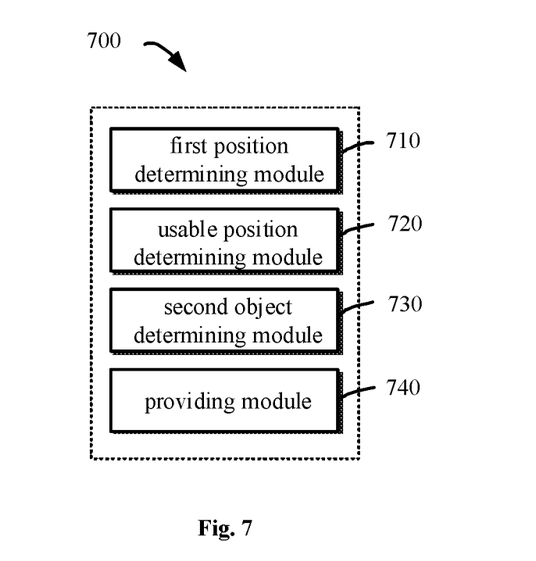
FIG. 7 is a block diagram illustrating an apparatus for providing a visual representation of a set of objects according to embodiments of the present disclosure.

FIG. 7 is a block diagram illustrating an apparatus 700 for providing a visual representation of a set of objects according to embodiments of the present disclosure. The apparatus 700 may be included in the computing device 120 in FIG. 1 or implemented as the computing device 120. As illustrated in FIG. 7, the apparatus 700 includes a first position determining module 710, configured to determine a first position in a drawing area. The first position is for providing first display information of a first object in the set of objects. The apparatus 700 further includes a usable position determining module 720, configured to determine a usable position associated with the first position from a plurality of preset positions in the drawing area. The apparatus 700 further includes a second object determining module 730, configured to determine a second object associated with the first object from the set of objects. In addition, the apparatus 700 further includes a providing module 740, configured to provide second display information of the second object in the usable position.

In some embodiments, the plurality of preset positions is distributed in the drawing area uniformly or regularly in rows or columns.

In some embodiments, the usable position determining module 720 includes: a second position obtaining module, a usable state determining module, and a second usable position determining module. The second position obtaining module is configured to obtain a second position associated with the first position. The usable state determining module is configured to determine whether the second position is usable based on historical drawing information, the historical drawing information indicating using conditions of the plurality of preset positions. The second usable position determining module is configured to determine the second position as the usable position in response to that the second position is usable.

In some embodiments, the apparatus 700 further includes: an updating module, configured to update the historical drawing information to indicate that the usable position is occupied.

In some embodiments, the second object determining module 730 includes: a relationship information obtaining module and a second object selecting module. The relationship information obtaining module is configured to obtain relationship information for indicating whether there is a relationship between the first object and an object other than the first object in the set of objects. The second object selecting module is configured to select the second object associated with the first object from the set of objects based on the relationship information.

In some embodiments, the providing module 740 includes: a second display information obtaining module and a first display module. The second display information obtaining module is configured to obtain the second display information based on a resource address associated with the second object. The first display module is configured to display the second display information obtained in the usable position.

In some embodiments, the second display information includes at least one of: an identifier, an image, a shape and a color for indicating the second object.

In some embodiments, the apparatus further includes: a second display module, configured to provide additional information associated with the second object in response to determining that the second display information is selected.

Figure 8:
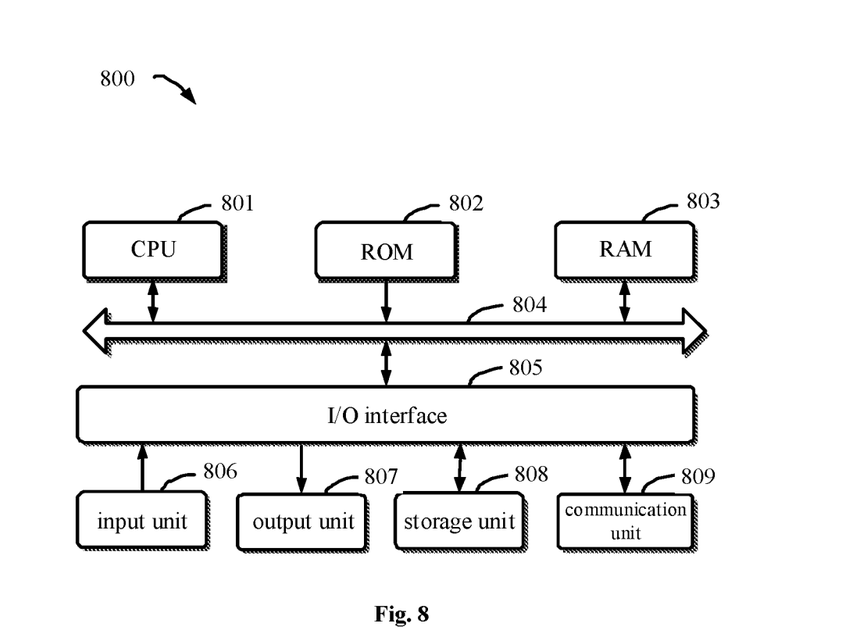
FIG. 8 is a block diagram illustrating a computing device capable of implementing a plurality of embodiments of the present disclosure.

FIG. 8 is a block diagram illustrating an exemplary device 800 capable of implementing a plurality of embodiments of the present disclosure. The device 800 may be configured as the computing device 120 in FIG. 1. As illustrated in FIG. 8, the device 800 includes a center processing unit (CPU) 801. The CPU 801 may execute various appropriate actions and processes according to computer program instructions stored in a read only memory (ROM) 802 or computer program instructions loaded to a random-access memory (RAM) 803 from a storage unit 808. The RAM 803 may also store various programs and date required by the device 800. The CPU 801, the ROM 802, and the RAM 803 may be connected to each other via a bus 804. An input/output (I/O) interface 805 is also connected to the bus 804.

A plurality of components in the device 800 are connected to the I/O interface 805, including: an input unit 806 such as a keyboard, a mouse; an output unit 807 such as various types of displays, loudspeakers; a storage unit 808 such as a magnetic disk, an optical disk;

and a communication unit 809, such as a network card, a modem, a wireless communication transceiver. The communication unit 809 allows the device 800 to exchange information/data with other devices over a computer network such as the Internet and/or various telecommunication networks.

The processing unit 801 executes the above-mentioned methods and processes, such as the procedure 200 and/or procedure 400. For example, in some embodiments, the procedure 200 and/or procedure 400 may be implemented as computer software programs. The computer software programs are tangibly contained in a machine readable medium, such as the storage unit 808. In some embodiments, a part or all of the computer programs may be loaded and/or installed on the device 800 through the ROM 802 and/or the communication unit 809. When the computer programs are loaded to the RAM 803 and are executed by the CPU 801, one or more blocks of the procedure 200 and/or procedure 400 described above may be executed. Alternatively, in other embodiments, the CPU 801 may be configured to execute the procedure 200 and/or procedure 400 in other appropriate ways (such as, by means of hardware).

The functions described herein may be executed at least partially by one or more hardware logic components. For example, without not limitation, exemplary types of hardware logic components that may be used include: a field programmable gate array (FPGA), an application specific integrated circuit (ASIC), an application specific standard product (ASSP), a system on chip (SOC), a complex programmable logic device (CPLD) and the like.

Program codes for implementing the method of the present disclosure may be written in any combination of one or more programming languages. These program codes may be provided to a processor or a controller of a general-purpose computer, a special purpose computer or other programmable data processing device, such that the functions/operations specified in the flowcharts and/or the block diagrams are implemented when these program codes are executed by the processor or the controller. These program codes may be executed entirely on a machine, partly on a machine, partially on the machine as a stand-alone software package and partially on a remote machine, entirely on a remote machine, or entirely on a server.

In the context of the present disclosure, the machine-readable medium may be a tangible medium that may contain or store a program to be used by or in connection with an instruction execution system, apparatus, or device. The machine-readable medium may be a machine-readable signal medium or a machine-readable storage medium. The machine-readable medium may include, but not limit to, an electronic, magnetic, optical, electromagnetic, infrared, or semiconductor system, apparatus, or device, or any suitable combination of the foregoing. More specific examples of the machine-readable storage medium may include electrical connections based on one or more wires, a portable computer disk, a hard disk, a RAM, a ROM, an erasable programmable read-only memory (EPROM or flash memory), an optical fiber, a portable compact disk read-only memory (CD-ROM), an optical storage, a magnetic storage device, or any suitable combination of the foregoing.

In addition, although respective operations are depicted in a particular order, it should be understood to require that such operations are executed in the particular order illustrated in the drawings or in a sequential order, or that all illustrated operations should be executed to achieve the desired result. Multitasking and parallel processing may be advantageous in certain circumstances. Likewise, although several specific implementation details are included in the above discussion, these should not be construed as limitation of the scope of the present disclosure. Certain features described in the context of separate implementations may also be implemented in combination in a single implementation. On the contrary, various features described in the context of the single implementation may also be implemented in a plurality of implementations, either individually or in any suitable sub-combination.

Although the subject matter has been described in language specific to structural features and/or methodological acts, it should be understood that the subject matter defined in the appended claims is not limited to the specific features or acts described above. Instead, the specific features and acts described above are merely exemplary forms of implementing the claims.

What is claimed is:

1. A method for providing a visual representation of a set of objects, comprising:
   when display information of any object is not provided in a drawing area, obtaining, by one or more computing devices, a main object in a set of objects as a first object, in which the main object is determined in response to the user input;
   determining, by the one or more computing devices, a first position in the drawing area, the first position for providing first display information of the first object in the set of objects;
   determining, by the one or more computing devices, a usable position associated with the first position from a plurality of preset positions in the drawing area, wherein the plurality of preset positions is distributed in the drawing area uniformly in rows and columns, wherein said determining by the one or more computing devices a usable position associated with the first position from a plurality of preset positions in the drawing area comprises: obtaining, by the one or more computing devices, a second position associated with the first position; determining, by the one or more computing devices, whether the second position is usable based on historical drawing information, the historical drawing information indicating using conditions of the plurality of preset positions; and determining, by the one or more computing devices, the second position as the usable position in response to that the second position is usable;
   determining, by the one or more computing devices, a second object associated with the first object from the set of objects, wherein each object in the set of objects is set with weight information in advance, and when there are a plurality of objects associated with the first object, an object with a higher weight is sequentially selected as the second object based on the weight information;
   providing, by the one or more computing devices, second display information of the second object in the usable position; and
   connecting, by the one or more computing devices, the first display information with the second display information in the drawing area to embody a relationship between the first object and the second object, in which different relationship types are distinguished by different lines.

2. The method of claim 1, wherein a corresponding identifier is distributed to each preset position for storing adjacent information.

3. The method of claim 2, further comprising:
   updating, by the one or more computing devices, the historical drawing information to indicate that the usable position is occupied.

4. The method of claim 1, wherein, determining, by the one or more computing devices, the second object comprises:
   obtaining, by the one or more computing devices, relationship information for indicating whether there is a relationship between the first object and an object other than the first object in the set of objects; and
   selecting, by the one or more computing devices, the second object associated with the first object from the set of objects based on the relationship information.

5. The method of claim 1, wherein, providing, by the one or more computing devices, the second display information of the second object comprises:
   obtaining, by the one or more computing devices, the second display information based on a resource address associated with the second object; and
   displaying, by the one or more computing devices, the second display information obtained in the usable position.

6. The method of claim 1, further comprising:
   providing, by the one or more computing devices, additional information associated with the second object in response to determining that the second display information is selected.

7. An electronic device, comprising:
   one or more processors; and
   a memory, configured to store one or more programs,
   wherein, the one or more processors is configured to read the one or more programs from the memory and execute the one or more programs to cause the electronic device to implement a method comprising:
   when display information of any object is not provided in a drawing area, obtaining a main object in a set of objects as a first object, in which the main object is determined in response to the user input;
   determining a first position in the drawing area, the first position for providing first display information of the first object in the set of objects;
   determining a usable position associated with the first position from a plurality of preset positions in the drawing area, wherein the plurality of preset positions is distributed in the drawing area uniformly in rows and columns, wherein said determining a usable position associated with the first position from a plurality of preset positions in the drawing area comprises: obtaining a second position associated with the first position; determining whether the second position is usable based on historical drawing information, the historical drawing information indicating using conditions of the plurality of preset positions; and determining the second position as the usable position in response to that the second position is usable;
   determining a second object associated with the first object from the set of objects, wherein each object in the set of objects is set with weight information in advance, and when there are a plurality of objects associated with the first object, an object with a higher weight is sequentially selected as the second object based on the weight information;
   providing second display information of the second object in the usable position; and
   connecting, by the one or more computing devices, the first display information with the second display information in the drawing area to embody a relationship between the first object and the second object, in which different relationship types are distinguished by different lines.

8. The electronic device of claim 7, wherein a corresponding identifier is distributed to each preset position for storing adjacent information.

9. The electronic device of claim 8, wherein the method further comprises:
   updating the historical drawing information to indicate that the usable position is occupied.

10. The electronic device of claim 7, wherein, determining the second object comprises:
   obtaining relationship information for indicating whether there is a relationship between the first object and an object other than the first object in the set of objects; and
   selecting the second object associated with the first object from the set of objects based on the relationship information.

11. The electronic device of claim 7, wherein, providing the second display information of the second object comprises:
   obtaining the second display information based on a resource address associated with the second object; and
   displaying the second display information obtained in the usable position.

12. The electronic device of claim 7, wherein the method further comprises:
   providing additional information associated with the second object in response to determining that the second display information is selected.

13. A non-transient computer-readable storage medium having a computer program stored thereon, wherein, when the program is executed by a processor of an electronic device, causes the electronic device to perform a method comprising:
   when display information of any object is not provided in a drawing area, obtaining a main object in a set of objects as a first object, in which the main object is determined in response to the user input;
   determining a first position in the drawing area, the first position for providing first display information of the first object in the set of objects;
   determining a usable position associated with the first position from a plurality of preset positions in the drawing area, wherein the plurality of preset positions is distributed in the drawing area uniformly in rows and columns, wherein said determining a usable position associated with the first position from a plurality of preset positions in the drawing area comprises: obtaining a second position associated with the first position; determining whether the second position is usable based on historical drawing information, the historical drawing information indicating using conditions of the plurality of preset positions; and determining the second position as the usable position in response to that the second position is usable;
   determining a second object associated with the first object from the set of objects, wherein each object in the set of objects is set with weight information in advance, and when there are a plurality of objects associated with the first object, an object with a higher weight is sequentially selected as the second object based on the weight information;
   providing second display information of the second object in the usable position; and
   connecting, by the one or more computing devices, the first display information with the second display information in the drawing area to embody a relationship between the first object and the second object, in which different relationship types are distinguished by different lines.

14. The non-transient computer-readable storage medium of claim 13, wherein the method further comprises:
   updating the historical drawing information to indicate that the usable position is occupied.

15. The non-transient computer-readable storage medium of claim 13, wherein, determining the second object comprises:
   obtaining relationship information for indicating whether there is a relationship between the first object and an object other than the first object in the set of objects; and
   selecting the second object associated with the first object from the set of objects based on the relationship information.

16. The non-transient computer-readable storage medium of claim 13, wherein, providing the second display information of the second object comprises:
   obtaining the second display information based on a resource address associated with the second object; and
   displaying the second display information obtained in the usable position.

17. The non-transient computer-readable storage medium of claim 13, wherein the method further comprises:
   providing additional information associated with the second object in response to determining that the second display information is selected.

* * * * *